July 26, 1960
L. G. TUCKER, JR., ET AL
2,946,112
PROCESS OF PRODUCING LIGHT WEIGHT AGGREGATE
Filed July 10, 1956
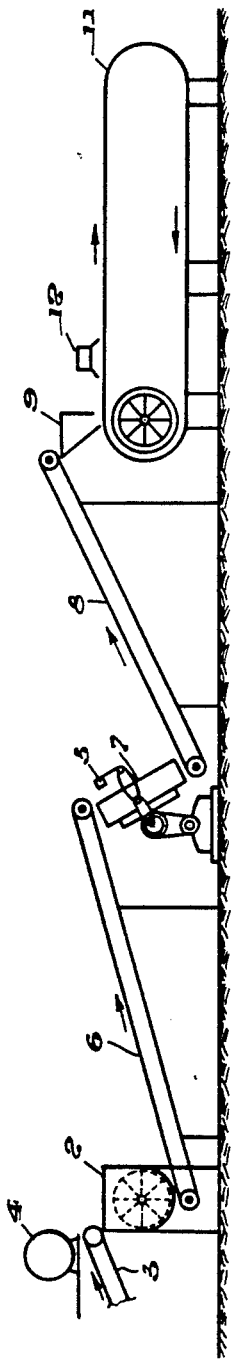
INVENTORS.
ANDREW J. KANTOR
LINWOOD G. TUCKER, JR.
BY Ralph B. Brick
their ATTORNEY.

United States Patent Office 2,946,112
Patented July 26, 1960

2,946,112

PROCESS OF PRODUCING LIGHT WEIGHT AGGREGATE

Linwood G. Tucker, Jr., and Andrew J. Kantor, Pittsburgh, Pa., assignors to Koppers Company, Inc., a corporation of Delaware Filed July 10, 1956, Ser. No. 596,922

5 Claims. (Cl. 25—157)

This invention relates to a process for producing light weight aggregate and more particularly to a process for producing light weight aggregate for various construction purposes by utilizing fly ash derived from coal combustion in boiler plants and the like.

With the increasing industrial expansion of today and the ever increasing demand for power, there has been a resulting increase in the by-products obtained in furnishing such power, one of these by-products being the fly ash which comes off of the exhaust stacks of coal burning boilers and the like, this fly ash being precipitated from the air by electrical and mechanical precipitators. So large has this quantity of fly ash become, that it has been estimated by experts in the field that industry will produce approximately 17 million tons of such material per year in the very near future. Accordingly, with such tremendous quantities of this material now being made available and with the industrial horizon promising even larger quantities, there has been a growing urgency to find ways of utilizing the material in the most efficient manner possible.

It has long been known in the art to utilize such fly ash as an additive in a road base, as an additive in cement mix, as a material in forming briquette blocks, and as a replacement for cement, concrete, and cinder blocks. And, more recently, new and promising markets have opened up in utilizing the fly ash as a means to form a light weight aggregate for numerous construction purposes. In this connnection, however, the fly ash has not proven entirely successful since there has been little, if any, control of the size and quality of particles formed from the ash when making up the aggregate. As a result, there necessarily has been a good deal of undesirable screening required, undesirable interruptions, and undesirable fly ash returns.

The present invention provides a process for utilizing fly ash to form a light weight aggregate which avoids these aforementioned difficulties and which is continuous, efficient, and economical, permitting control of particle size and quality without undesirable screening, interruptions, and fly ash return.

Various other features of the present invention will become obvious upon a reading of the disclosure set forth hereinafter.

More particularly, the present invention provides a process of forming a light weight aggregate comprising treating fly ash derived from coal combustion with a binder material, pelletizing the binder-treated fly ash to form firm pellet particles which provide porosity in subsequent treatment, and sintering the pellet particles to form a hardened light weight aggregate which is suitable for various construction purposes. Further, the present invention provides a process which utilizes with this fly ash in producing the light weight aggregate, a boiler grate bottom ash of coarser nature than the fly ash.

It is to be understood that various changes can be made by one skilled in the art in the several steps of the inventive process set forth herein without departing from the scope or spirit of the present invention.

Referring to the drawing, a schematic flow arrangement is disclosed which broadly presents one advantageous embodiment for carrying out the inventive process.

As can be seen in this drawing, the first step in the process is to collect and introduce the fly ash into a mixing apparatus 2. As aforementioned, the fly ash can be derived from boiler plants and the like which use coal as their combustion product for obtaining power, and which use an electrical precipitator or mechanical dust collector to filter out the fly ash as it passes to the waste stack. The fly ash is usually of fine grade, approximately 300 mesh, but it is to be understood that this grade can vary in accordance with the plant from which the ash is derived and the coal used in such plant. In this connection, it is to be noted that in some instances where a large amount of bottom ash is available from the boiler grate, such bottom ash can be mixed with the fly ash in the proportions of approximately four parts fly ash by weight to approximately one part bottom bottom ash by weight, the bottom ash being of a coarser grade, approximately 50 mesh. It is also to be understood that the ratio of bottom ash to fly ash can vary in accordance with plant production.

The mixing apparatus 2 can be one of any number of well known type mixers such as a double shaft pug mill or the like, and in some instances, even a concrete mixer has been found suitable for the purpose.

Once the fly ash or combination of fly ash and bottom ash have been introduced into the mixing apparatus 2, a binding material is then added into the apparatus. It has been found that one of the most advantageous materials to serve as a binder is bentonite, an extremely alkaline plastic material which serves to stabilize the fly ash when it is formed into pellets, as is described hereinafter. In this connection, whenever fly ash with a comparatively high carbon content (approximately 10% or higher) is used, a binder of sodium silicate, also of an alkaline nature, can be substituted for the bentonite.

The binders, of either bentonite or sodium silicate, can be added to the mixing apparatus either in powder or slurry form so that they constitute approximately ½% to approximately 2% by weight of the entire dry mix. When introduced in slurry form, the binder material is first mixed with the water in such proportions that the resulting total mixture comprises approximately ½% to approximately 2% binder material by weight based on a dry mix, approximately 15% to approximately 23% water by weight, and the remainder by weight, fly ash (or fly ash and bottom ash).

In the disclosed drawing the binder, either in slurry or powder form, is introduced into the mixing apparatus 2 by an endless conveyor 3 which is associated with a binder slurry or water reservoir 4. The binder is introduced into the mixing apparatus on top of the fly ash and is mixed for a selected length of time until proper mixing has been accomplished. In some instances, a satisfactory residence time in the mixing apparatus to provide thorough mixing has been found to be approximately 30 seconds.

Once the binder has been properly mixed with the fly ash material, the material is conveyed by an endless conveyor 6 to a pelletizer 7. The pelletizer can be one of several well known commercial types commonly referred to as disc type or saucer type pelletizers. As the mixture is introduced into the pelletizer, a small additional amount of water is added to the mixture from the spray apparatus 5 so that the total mixture to be pelletized is advantageously comprised of approximately ½% to approximately 2% binder material by weight based on a dry mix, approximately 23% to approximately 26% water by weight, and the remainder by weight fly ash. In this connection, it is to be noted that the percentage of water by weight of the mixture at the mixing apparatus 2 is advantageously held to approximately 23% and is subsequently increased from approximately 23% to approximately 26%. This manner of adding the water to the mixture in the embodiment disclosed has been found to be advantageous since it prevents the mixture from sticking to the endless conveyor 6 as it is transferred from the mixer 2 to the pelletizer 7. The residence time of the material in the pelletizer, like the residence time in the mixer, also can vary in accordance with materials being used, and, in one advantageous embodiment of the invention, it has been found that with a one meter diameter pelletizer the material can be pelletized at the rate of 1700 pounds per hour. Further, the speed and tilt angle of the pelletizer can be varied in order to obtain selected size pellet particles of uniform size and quality. In this connection, it is to be noted that if a fused mass is desired as a result of the sintering step which is described hereinafter, the pellets are reduced to a very small size, and, thus, upon sintering, fuse together in a solid mass. On the other hand, if individual sintering pellets are desired, the pelletizer is adjusted to produce larger pellets which are sintered individually without fusing.

Although the selected size for the pellet particles can vary in accordance with results desired, in an advantageous embodiment of the invention, it has been found desirable that the pellet particles be of a substantially uniform size within a size range of from approximately 1/16 of an inch to approximately 3/8 of an inch in diameter. In this connection, it is to be noted that these ball-like particles serve to effect porosity in the sintering step described hereinafter, thus permitting the proper passage of air in carrying out such a step.

Once the material has been properly pelletized into ball-like particles, advantageously of a uniform dimension within the above-stated range and of sufficient firmness to maintain identity in the steps that follow, the material is then conveyed from the pelletizer 7 by endless conveyor 8 to a receiving hopper 9 which feeds the raw pellets unto a sintering machine 11. The sintering machine can be any one of several well known types of sintering machines which can perform continuous sintering with either an induced or forced draft. In the embodiment disclosed in the drawing, an ignition furnace 12 is positioned above the endless conveyor of the machine to ignite the pellets as they travel on the conveyor.

The pelletized material is sintered at the rate of approximately .75 inch per minute to approximately .95 inch per minute with a sinter bed depth of about 7 inches and with temperatures ranging from approximately 250° F. to approximately 500° F. It is to be noted that the particular temperature used in carrying out the sintering process depends upon the percentage of carbon present in the fly ash. For example, in fly ash having 10% carbon by weight, the desired temperature would be approximately 500° F. If the percentage of carbon in the fly ash should be less, the temperature would also be less. For example, if the carbon percentage were 3½% by weight, the temperature would be approximately 350° F.

It is to be noted that in instances where a high carbon fly ash is utilized, the pellets are fused together and the solidly caked material is then broken into light weight aggregate by a conventional type mechanism such as a jaw crusher or a roller (not shown), reducing the cake to a desired size depending upon its use. In this connection, it is also to be noted that the low carbon material does not fuse into cake form but retains a pellet-like status, the carbon being burned out in each pellet particle by the sintering machine to effect a hardening of each pellet.

In instances where fly ash of a carbon content as high as 12% has been used to form a cement block, the resulting block has been tested to have a breaking strength as high as 1,000 pounds per square inch, this being considered by those skilled in the art as "Grade A" sinter block.

The invention claimed is:

1. A process for forming a light weight aggregate from fly ash derived from the combustion of coal comprising the steps of treating fly ash of approximately 300 mesh fineness with bentonite having proportions of ½ to 2% by weight of bentonite based on weight of the dry mix, approximately 23% to approximately 26% by weight of water and remaining portions of the fly ash, pelletizing said binder and fly ash mixture to form porous fly ash agglomerates in the form of discrete pellets of substantially uniform size, and sintering a multi layer mass of said pellets to form hardened light weight aggregate.

2. A process for forming a light weight aggregate from fly ash derived from the combustion of coal comprising the steps of treating fly ash of approximately 300 mesh fineness with sodium silicate having proportions of ½ to 2% by weight of sodium silicate based on weight of the dry mix, approximately 23% to approximately 26% by weight of water and remaining portions of the fly ash, pelletizing said binder and fly ash mixture to form porous fly ash agglomerates in the form of discrete pellets of substantially uniform size, and sintering a multi layer mass of said pellets to form hardened light weight aggregate.

3. A process for forming a light weight aggregate comprising mixing approximately four parts by weight of fly ash of approximately 300 mesh fineness derived from the combustion of coal with one part of weight of bottom ash of approximately 50 mesh fineness derived from coal combustion, treating said mixture of fly ash and bottom ash with an inert and adhesive binder selected from one of the group consisting of bentonite and sodium silicate in the proportions of ½ to 2% by weight of binder based on the weight of the dry mix, approximately 23 to approximately 26% by weight of water and remaining portions of fly ash, pelletizing the resultant binder treated mixture to form firm pellets of substantially uniform size, and sintering a multi layer mass of said pellet particles to form hardened light weight aggregate.

4. A process for forming a light weight aggregate from fly ash of approximately 300 mesh fineness derived from the combustion of coal comprising the steps of mixing with the fly ash an inert and adhesive binder selected from one of the group consisting of bentonite and sodium silicate in the proportions of ½ to 2% by weight of binder based on the weight of the dry mix, approximately 23 to approximately 26% by weight of water and remaining portions of fly ash, pelletizing said binder and fly ash mixture to form porous fly ash agglomerates in the form of discrete pellets of substantially uniform size, and sintering a multi layer mass of said pellets to form hardened light weight aggregate.

5. A process for forming a light weight aggregate from fly ash of approximately 300 mesh fly ash derived from the combustion of coal comprising the steps of admixing to the fly ash an inert and adhesive binder selected from one of the group consisting of bentonite and sodium silicate and in which said binder comprises approximately ½ to 2 percent weight of the mixture, pelletizing said binder and fly ash mixture to form porous fly ash agglomerates in the form of discrete pellets of substantially uniform size, and sintering a multi layer of mass of said pellets to form hardened light weight aggregate.

References Cited in the file of this patent
UNITED STATES PATENTS 1,442,413   Olson  ---------------- Jan. 16, 1923

(Other references on following page)

UNITED STATES PATENTS

| | | |
|---|---|---|
| 2,105,324 | Huttemann | Jan. 11, 1938 |
| 2,430,601 | Cleary | Nov. 11, 1947 |
| 2,459,685 | Cummins | Jan. 18, 1949 |
| 2,544,752 | Gelbman | Mar. 13, 1951 |
| 2,564,690 | Havelin et al. | Aug. 21, 1951 |
| 2,569,323 | Maynard | Sept. 25, 1951 |
| 2,676,892 | McLaughlin | Apr. 27, 1954 |
| 2,691,598 | Meurice et al. | Oct. 12, 1954 |
| 2,724,656 | Gunzelmann | Nov. 22, 1955 |
| 2,729,570 | Nichols | Jan. 3, 1956 |

FOREIGN PATENTS

| | | |
|---|---|---|
| 732,125 | Great Britain | June 22, 1955 |
| 699,233 | Germany | Nov. 25, 1940 |

OTHER REFERENCES

"Industrial Minerals and Rocks," Mudd Series (1949), pp. 124–5.